United States Patent
Duss et al.

(10) Patent No.: US 9,912,871 B2
(45) Date of Patent: Mar. 6, 2018

(54) METHOD FOR MONITORING A POST PRINT PROCESSING MACHINE

(71) Applicant: Mueller Martini Holding AG, Hergiswil (CH)

(72) Inventors: Hanspeter Duss, Buchs (CH); Christoph Gysin, Ormalingen (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 0 days.

(21) Appl. No.: 14/617,427

(22) Filed: Feb. 9, 2015

(65) Prior Publication Data
US 2015/0229845 A1    Aug. 13, 2015

(30) Foreign Application Priority Data
Feb. 7, 2014   (CH) ...................... 0167/14

(51) Int. Cl.
*H04N 5/225*   (2006.01)
*H04N 5/232*   (2006.01)
(Continued)

(52) U.S. Cl.
CPC ..... *H04N 5/23293* (2013.01); *B41F 33/0036* (2013.01); *B65H 7/14* (2013.01); *B65H 7/20* (2013.01); *B65H 11/007* (2013.01); *B65H 43/08* (2013.01); *G06F 3/041* (2013.01); *H04N 5/2257* (2013.01); *B65H 2301/542* (2013.01); *B65H 2301/544* (2013.01); *B65H 2511/20* (2013.01); *B65H 2511/413* (2013.01);
(Continued)

(58) Field of Classification Search
CPC ............ G01N 2021/8663; G01N 21/89; G06T 2207/30168
See application file for complete search history.

(56) References Cited

U.S. PATENT DOCUMENTS 8,704,903 B2 *   4/2014   McClellan ............. H04N 5/232
                                                        348/159
2002/0149808 A1 *  10/2002   Pilu ........................ H04N 1/387
                                                        358/530
(Continued)

FOREIGN PATENT DOCUMENTS

| DE | 102007058708 A1 | 6/2008 |
| DE | 202012101524 U1 | 7/2012 |
| EP | 1952986 A1 | 8/2008 |
| WO | WO-2010009561 A1 | 1/2010 |

OTHER PUBLICATIONS

International Search Report of CH 1672014 dated Jun. 12, 2014 with an English translation.

*Primary Examiner* — Twyler Haskins
*Assistant Examiner* — Dwight C Tejano
(74) *Attorney, Agent, or Firm* — FisherBroyles, LLP; Robert Kinberg (57) ABSTRACT

A method and a device for monitoring a post print processing machine through which printed products are successively transported. An image recording device is assigned to the post print processing machine and connected to a computer unit for recording during each operating cycle an image series with at least two images of a printed product, spaced apart by a time interval. The images of the image series are transmitted to the computer unit and the images are displayed in real time on a display device that is connected to the computer unit.

10 Claims, 3 Drawing Sheets

(51) Int. Cl.
  *B41F 33/00* (2006.01)
  *B65H 7/14* (2006.01)
  *G06F 3/041* (2006.01)
  *B65H 43/08* (2006.01)
  *B65H 11/00* (2006.01)
  *B65H 7/20* (2006.01)

(52) U.S. Cl.
  CPC ...... *B65H 2513/50* (2013.01); *B65H 2553/42* (2013.01); *B65H 2557/11* (2013.01); *B65H 2557/12* (2013.01); *B65H 2557/63* (2013.01); *B65H 2557/65* (2013.01); *B65H 2701/1311* (2013.01); *B65H 2701/1315* (2013.01)

(56) References Cited

U.S. PATENT DOCUMENTS

| | | | |
|---|---|---|---|
| 2004/0163562 A1* | 8/2004 | Lewis, Jr. | B41F 33/0081 101/485 |
| 2005/0213795 A1* | 9/2005 | Sawamura | B41F 33/0036 382/112 |
| 2006/0230358 A1* | 10/2006 | Sacher | B41F 33/0036 715/781 |
| 2006/0239510 A1* | 10/2006 | Tatarczyk | B41F 33/00 382/112 |
| 2008/0196612 A1 | 8/2008 | Rancourt et al. | |
| 2009/0284587 A1* | 11/2009 | Berg | B41F 33/0009 348/61 |

* cited by examiner

METHOD FOR MONITORING A POST PRINT PROCESSING MACHINE

CROSS-REFERENCE TO RELATED APPLICATIONS

This application claims priority to Swiss Application No. 00167/14, filed Feb. 7, 2014, the disclosure of which is incorporated herein by reference in its entirety.

BACKGROUND OF THE INVENTION

The invention relates to a method and a device for monitoring a post print processing machine through which printed products are transported successively, wherein an image recording device that is assigned to the post print processing machine and is connected to a computer unit records with a time interval an image series, comprising at least two images, of a printed product during each operating cycle. The images are then transmitted to the computer unit where the images of the image series are displayed on a display device that is connected to the computer unit.

Processing stations which can process a multitude of printed products per second are used for the processing of printed products. In this connection, the processing speed is frequently specified as number of operating cycles per time unit, for example "number of operating cycles per hour." A single operating step is generally carried out on a printed product during one operating cycle and/or the printed product is conveyed further by a specific distance during the operating cycle. In the following operating cycle, the next printed product is then subjected to the same operating step and/or the next printed product is conveyed further by the same distance. Owing to the fact that the printed products are flexible products for which the processing quality depends to a high degree on the processing speed, it is a problem in many cases to adjust the operating parameters of the processing stations so as to ensure a problem-free processing of the printed products at a predetermined processing speed and in cases of an increase or reduction in the processing speed. It has proven to be especially problematic in this connection that the sequential processes in the processing stations occur so fast that they can no longer be seen with the human eye. A visual control of the effects on the printed products caused by a change in the operating parameters is thus hardly possible. In addition, existing measuring means such as light barriers, presence check devices and similar sensors cannot be used to determine the quantitative deviation from the ideal operation.

A method and a device for solving these problems are described in the European Patent document EP 1952986 A1, for which initially a light flash is generated which is controlled synchronously with the operating cycle. This light flash creates for the eye of the operator a static image of a moving process in the post print processing operation, which image allows the operator to detect critical production states that cannot be seen with the naked eye and cannot be solved without auxiliary means. During each operating cycle and as a result of the static image generated with the light flash for the observer, the image recording device will simultaneously record an image during each operating cycle of the printed products to be processed. The machine control evaluates the images which respectively show the position of a printed product and then transmits corresponding signals to the adjustment members, provided the process needs to be adjusted.

The German Patent document DE102007058708 A1 also describes a method and a device by means of which certain regions of the printing press are filmed with a video camera and the video films are stored in a storage device or memory. To aid operating personnel during the process of making adjustments and carrying out difficult operations, as well as to analyze and detect error functions, the stored video data can subsequently be transmitted via a data line to an optional control location for the printing press. The recorded processes can thus be viewed again in further detail, e.g. in slow motion, at a later moment.

However, it has turned out that none of the above-described known methods permit a reliable machine adjustment and/or a permanent monitoring of the production processes at high processing speeds.

SUMMARY OF THE INVENTION

In view of these problems with the prior art, it is an object of the present invention to provide a method of the above-described type which allows an easy, reliable and more quickly implemented adjustment and monitoring of the operating parameters of processing stations for printed products, along with a device designed to realize corresponding methods.

The above and other objects are achieved according to an embodiment of the invention in that the images are displayed in real time on a display device and by providing a device for the real-time display of the first image of the image series.

Displaying the recorded images in real time is understood to mean that the images are displayed within a predetermined time interval and that new images are displayed continuously. The device for realizing the method according to the invention is designed such that the recording, transmitting and displaying of the image data reliably occurs within the specified time interval. The display of the generated images in real time for the operator thus can keep in step with the recording of the images. As compared to the method known from the above mentioned EP 1952986 A1, the method according to the invention permits a real-time evaluation of dynamic processes in order to check and optimize the operating parameters of the processing stations in real time, taking into consideration these dynamic processes. A more direct, more immediate, earlier and faster monitoring of the production processes is thus achieved, and the adjustment of the operating parameters for the processing stations is improved and facilitated.

As compared to the method known from the above mentioned DE 102007058708 A1, the time required for adjusting the operating parameters of the processing stations can be reduced noticeably with the method according to the invention because the display of the operating processes taking place during one processing cycle and is not based on recorded data, but occurs in real time, so that the result of the change in the operating parameters can be observed immediately and continuously by the operator. Depending on the application and processing speed, the images can even be displayed during the same processing cycle during which the image454s were recorded, or during the following processing cycles. Importantly, the display occurs continuously and within the specified time limits. For post print processing machines, the interval between the recording of the first image of an image series and the display usefully should not take more than three seconds since otherwise the reference is lost to the actual sequence of processes.

To display the recorded images as promptly as possible for the operator, it is conceivable for the display to start without noticeable time delay during the operating cycle in which the first image of an image series was recorded.

On the whole, the adjustment of the operating parameters for the processing stations can be accelerated considerably when using the method according to the invention, wherein a better adjustment result is achieved simultaneously and in a reliable manner.

According to a preferred embodiment of the invention, a time interval between two images is changed when displaying the images, as compared to the time interval when recording the images. It is particularly advantageous if the time interval between two images is increased for the display, relative to the time interval for recording the images, thereby generating and displaying a real time slow-motion display.

It is furthermore conceivable that with movements and operating steps that progress slowly during the display of the images, the time interval between two images is reduced relative to the time interval for recording the images and, accordingly, a time lapse representation is generated and displayed. For the time-lapse display, however, the start of the image series display on the display device cannot take place immediately after the recording of the first image, in contrast to the slow-motion representation. The representation must be delayed, so that the recording of the last image in the series can occur prior to its display.

It has turned out that it is especially advantageous if the time period for displaying the images is shorter or of the same length as the time period of an operating cycle during which the images were recorded. For example, this allows displaying fast movements of machine components that are repeated during each operating cycle, meaning successively for each operating cycle and in real time.

When using the method according to the invention, for example, for complex processes involving several components, the time interval between two images can be selected or adjusted to be longer for displaying the images, as compared to the time interval for recording the images. A slow-motion display of the images can thus be generated and shown, for which the images are displayed during an interval that is longer than the interval of the operating cycle in which the images were recorded. As a result and depending on the time period of the slow-motion representation, only the processes of each $x^{th}$ operating cycle can be displayed, wherein x exceeds or is equal to two.

A moment for recording the first image of the image series is advantageously determined by a position encoder that operates synchronously with the machine, is assigned to the post print processing machine, and is connected to the image recording device and/or the computer unit. As a result, the image series can always start at a desired moment during an operating cycle.

As an alternative to using a position encoder, a moment for recording the first image of the image series can also be determined by the image-recording device by detecting in an image, recorded by the image recording device, the position of machine parts or of printed products to be processed. A further alternative to using a position encoder is to determine the moment for recording the first image of the series with correspondingly arranged initiators or photo-electric cells (light barriers), which are also used to detect the position of components and/or printed products. The alternative design variants make it possible that the image series can always be started during an operating cycle at precisely the moment when a printed product or a machine component is in a specified location, for example if an image series is to start shortly before a printed product is aligned at an end stop or if the lowering blade of a knife impacts with the printed product. Furthermore, the operator can also change the moment for recording the first image of the image series, relative to the angle position of the position encoder and/or the position of the components and/or the printed products. As mentioned in the above, the operator can thus achieve that the recording and displaying of an image series starts precisely at the point where a process to be monitored or observed occurs in the post print processing machine. By changing an operating parameter, e.g. the machine speed or the format of a printed product, the instant of interest to the operator can shift.

According to one variant of the method, the time intervals between images are kept constant during the display while the speed of the post print processing machine changes. With the method according to the invention, if an image series with a number of images is displayed during an operating cycle in which the speed for the post print processing machine increases, the time interval between respectively two images is reduced. However, for a better comparison of processes, it may be advantageous for the operator if the recorded images are displayed with the same time-lag representation, meaning the time interval between two images remains constant. However, in the aforementioned case not all images can be shown since the display of all images in the image series takes longer than one operating cycle. Or, as described in the above, only representations of the observed processes of each x operating cycle can be displayed.

According to a different variant of the method, the time intervals between images, especially between two successive images of an image series, are changed during the recording and/or displaying, wherein the time intervals between two successive images of an image series can be adjusted differently. The change in the time intervals as well as the number images of an image series that are recorded during one operating cycle, for example, can be input directly into the computer unit or can be transmitted to the computer unit with the aid of an input device that is connected via a data line or wirelessly to the computer unit. It is furthermore conceivable for an operator to select the time intervals from predetermined values which are stored in the computer unit or which have been transmitted to the computer unit.

The position deviation can be shown for all three dimensions and can also be computed quantitatively with the aid of image processing by visually displaying the images in the computer unit during the course of the further processing. Thus, it is possible to determine the deviations in time with respect to the position and the geometric shape of a printed product from a value that is computed or specified. It is furthermore possible to determine a variation of the spacing between the image recording device and a printed product, using a changed image scale of a printed product. In the same way, deviations can be detected automatically with the aid of the image processing during the further processing and can then be corrected manually by an operator or automatically by a control unit connected to the computer.

As previously explained, it has proven useful within the framework of the invention if the image data are compared during the further processing to predetermined, desired data and, in case of deviations, if the operating parameters of the post print processing machine are accordingly changed or adapted automatically. For example, these operating parameters refer to adjustments on drive motors (e.g. servomotors)

which serve to synchronize a post print processing machine with upstream-positioned or downstream positioned processing systems, to actuators and/or positioning motors, to starting and stopping points, as well as to flow volumes of pressure valves and vacuum valves and injectors. With the method according to the invention, the changes in the adjustments are visible and can be measured immediately and without delay.

It has proven advantageous if the device for monitoring a post print processing machine is provided with a control unit for the operator to easily change the time interval between two images of an image series for the display and, in particular, to increase it. It is also helpful if additional adjustments of the display device can be made with this control unit, for example to change the image section that is displayed, as well as to change the brightness, the contrast and the color. Another embodiment includes the use of a control unit to make adjustments to the image recording device, e.g. to determine the start of the recording, the number of images to be recorded, the time interval between two images and the like, prior to the operation or during the operation of the post print processing machine. It is also conceivable if the time elapsing between the recording and the displaying of the images is manually input by the operator. However, it is advantageous if the device according to the invention automatically computes and/or specifies the shortest possible time period between recording and displaying of the images, wherein the time period depends, for example, on the size and/or resolution of the images, the number of images to be recorded, the speed with which the image data can be processed in the various components of the device for monitoring a post print processing machine.

Controlling the device for monitoring a post print processing machine is particularly easy if the display device is embodied as a display screen, in particular as touch-sensitive display screen. The operator can also input data easily and directly if the control unit is provided with a touch-sensitive display screen, or is integrated into the touch-sensitive display screen.

The number of data lines and thus also the number of possible error sources can be reduced if the computer unit used with a further embodiment of the inventive device is integrated into the image recording device or the display device.

To display images in real time on the display device, it is advantageous if the device for monitoring a post print processing machine comprises data links by means of which the digital data for the images can be transmitted so-to-speak without delay. According to one modified version of the invention, the data lines arranged between the image-recording device, the computer unit, the control unit, and the display device are embodied, at least partially, as a bus system.

A particularly high variability when using the method according to the invention can be achieved if the image data are transmitted wireless between the components of a device for monitoring a post print processing machine and/or if at least one image recording device is controlled wirelessly for recording the image data because, in that case, the image recording device can be used independent of the signal transmitting lines or the data lines.

A continuous monitoring in real time of the processing of printed products can thus be realized with the method and the device according to the invention. For this, respectively at least one display device and/or one image recording device, if applicable, connected wirelessly via a radio network to the computer unit, can thus be assigned to the device for monitoring a post print processing machine.

BRIEF DESCRIPTION OF THE DRAWINGS

The invention is explained in the following with reference to the drawing, to which we refer for all details essential to the invention and not emphasized further in the description. The drawing shows in.

DETAILED DESCRIPTION OF THE INVENTION

Figure 1A:
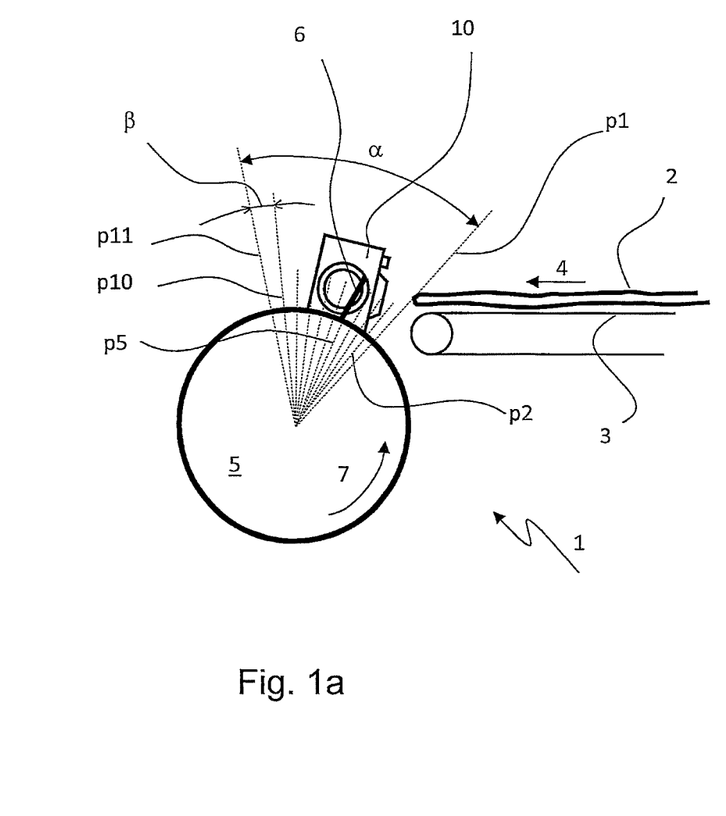
FIG. 1a A schematic representation of a device for monitoring a post print processing machine with an image recording device in a first position.
Figure 1B:
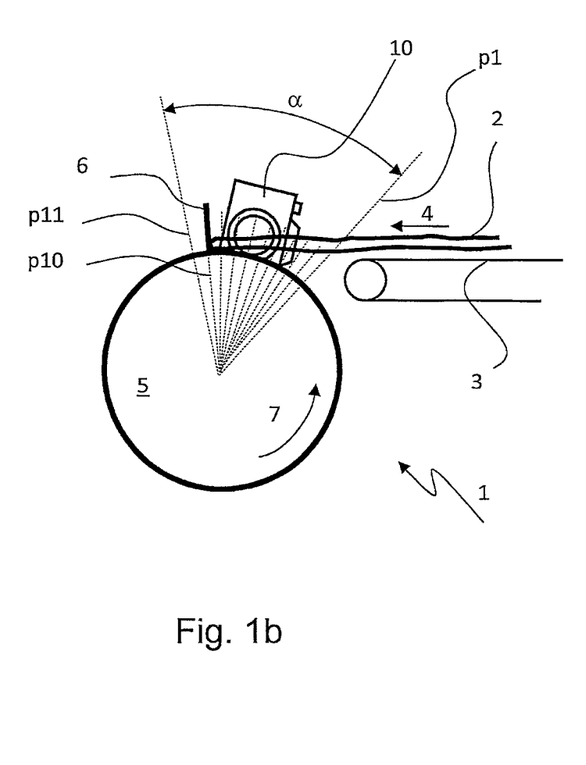
FIG. 1b A schematic representation of the device according to FIG. 1a, in a second position.

FIGS. 1a and 1b show a device 1 for monitoring a post print processing machine, not shown in its entirety, on which printed products 2 positioned on a conveying device 3 are transported in a transporting direction 4. The driven conveying device 3 can be embodied as a belt, a band or a chain with or without cams. It is furthermore conceivable that the conveying device 3 is embodied as a locally fixed roller table or as a guide arrangement, for example as a flat table with a low-friction surface, and that the printed products 2 are moved with the aid of grippers, carriers or transport fingers. The conveying device 3 conveys the printed products 2 to a drum 5, provided with one or several spaced-apart end stops 6 which are distributed along the circumference of the drum 5. The end stops 6 rotate in rotational direction 7 which is indicated by an arrow around the circumference of the drum 5 and are spaced apart in axial direction of the drum 5. FIG. 1a) shows a snapshot at a moment just before the printed product 2 reaches the end stop 6. FIG. 1b) shows a snapshot at a moment where the printed product 2 reaches the end stop 6 and is aligned thereon. In the region where the printed product 2 approaches the end stop 6 and is finally aligned thereon, an image recording device 10 is arranged, for example embodied as a camera. Advantageously, a digital camera is used which is provided with an electronic image converter, known as a two-dimensional CCD sensor. The images recorded with the digital camera (photographs and/or videos) consist of data which can be stored on a digital storage medium if necessary. In contrast to images recorded on a film with an analog camera, the digital image data from a digital camera can very easily and quickly be transmitted, processed, displayed and/or stored. The image recording device 10 is positioned according to FIG. 1 to the side of the drum 5, so that a number n of images p1 . . . pn can be recorded, showing the approach to and the alignment of the printed product 2 on the end stop 6.

Figure 2:
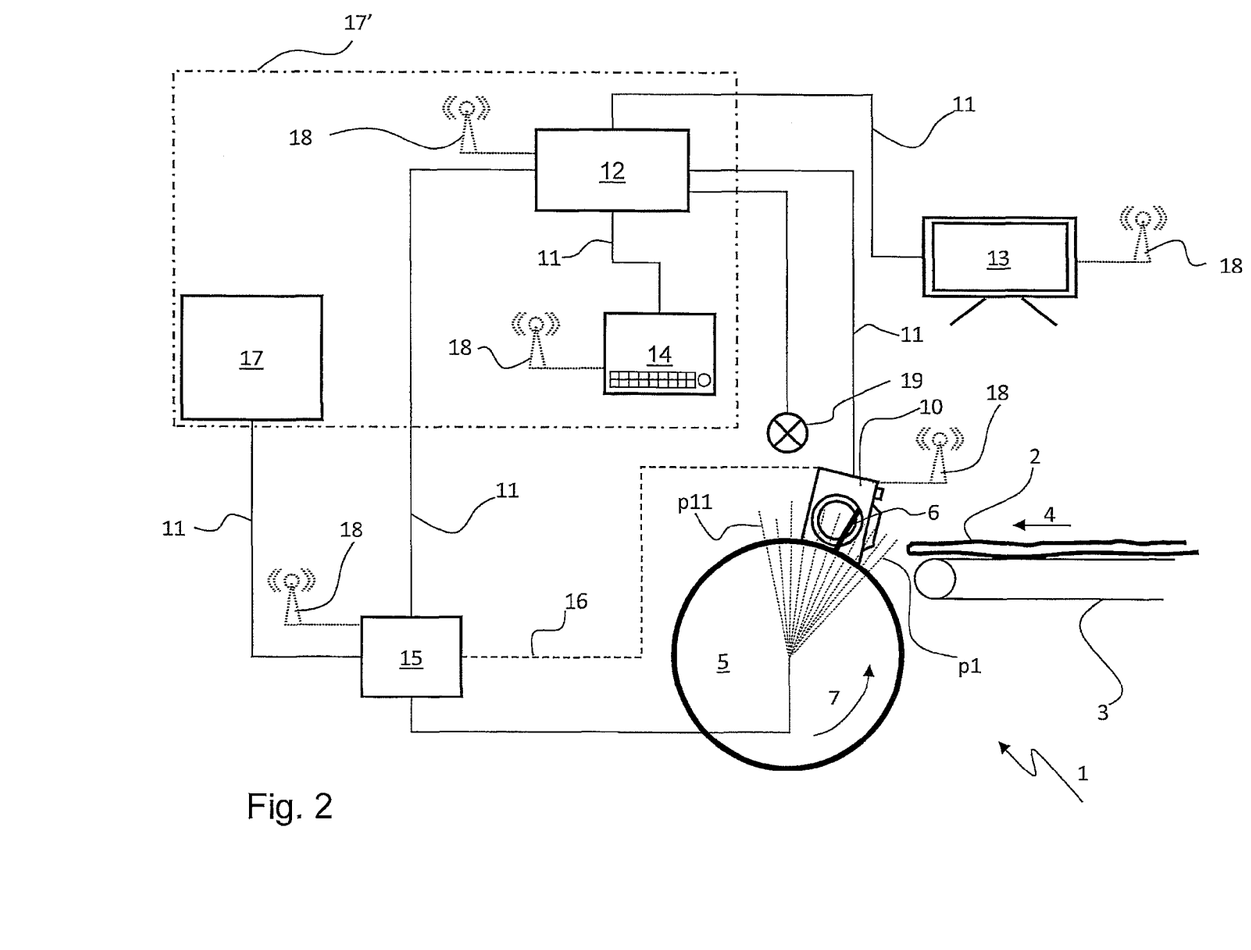
FIG. 2 A schematic representation of the device for monitoring a post print processing machine, and FIG. 3 A representation of the time interval during the recording and the display of the images.

FIG. 2 shows that the image recording device 10 is connected via a data line 11 to a computer unit 12. A control unit 14 and a display device 13 are furthermore connected via data lines 11, which can be embodied at least in part as a bus system, to the computer unit 12. With the aid of the control unit 14, an operator can change or input settings on the image recording device 10, the computer unit 12 and the display device 13. The display device 13 is suitable for displaying monochromatic or colored images which are transmitted by the computer unit 12. For example, this display device can be a commercially available computer screen which is installed stationary. According to a preferred embodiment, the display device 13 is embodied as a portable, mobile device with a screen and can be carried along by the operator to any optional location, at least along the post print processing machine, and is suitable for displaying the recorded images. The device 1 can furthermore comprise several mobile and/or stationary display devices 13 which are connected to the computer unit 12. It may be advantageous for an easy operation of the display device 13 if the screen is embodied touch-sensitive, meaning the display device 13 can conceivably be a laptop, a tablet computer or a smartphone. The same is true for the control unit 14, wherein the display device 13 and the control unit 14 can be combined into a single device.

To detect the angle of rotation and the rotational speed of the drum 5, a position encoder 15 can be connected to the drive for the drum 5, not shown herein, or can be installed directly on the axis of rotation for the drum 5. The signals from the position encoder 15 are transmitted via a data line 11 to the computer unit 12. Furthermore conceivable is that the position information of the encoder 15 is connected via an additional data line 16 directly to the image recording device 10. To control the post print processing machine, it may be necessary to also connect the position encoder 15 to the machine control 17 of the post print processing machine. Also conceivable is that the computer unit 12 and/or the control unit 14 form a part of the machine control 17' for the post print processing machine. The machine control 17 can be omitted when using a machine control 17', shown in FIG. 2 with a dash-dot line. The computer unit 12 can furthermore be integrated into the image recording device 10 or the display device 13. Alternatively, the computer unit 12, the image recording device 10, and the control unit 14 form a single, integral unit together with the display device 13.

In order to have more freedom of movement when working with the device 1 for monitoring the post print processing machine, individual or all data lines 11 between the aforementioned components 12, 13, 14, 15 of the device 1 can be replaced by wireless data transmission, for example with the aid of WLAN or Bluetooth. For this, the components 12, 13, 14, 15 are connected to a transmitting and receiving unit 18 for the wireless data exchange, or they are already integrated into this unit.

The operator must adjust the phase position of the drum 5 movement in such a way that the printed product 2 hits the end stop 6 at the correct instant. For this example, a complete rotation of the drum 5 corresponds to one operating cycle. According to the invention, a number n of images p1 . . . pn are recorded with the image recording device 10 during the relevant part of the operating cycle, which is denoted with the angle α in FIG. 1 and represents a range of approximately 60°. In the process, an image is respectively recorded after one rotation of the end stop 6 around an angle β amounting to 6°. For this example, the image recording device 10 records eleven images p1 . . . p11 of the relevant segment with angle α of 60° of the operating cycle, represented by a complete drum 5 rotation of 360°. Of course, more or fewer images of the relevant region can also be recorded. For example, the angle α of the relevant region can be only 15° or also 120° or more, or the angle β between two recordings can amount to only 1° or more than 6°.

The region monitored by the device 1 can optionally also be illuminated permanently or briefly by a lighting device 19 to increase the quality of the recorded images p1 . . . pn (FIG. 2). The lighting device 19 can be integrated into the image recording device and can be controlled by said device or, as shown in FIG. 2, can be embodied as independent, free-standing unit that is connected to the computer unit 12.

Figure 3:
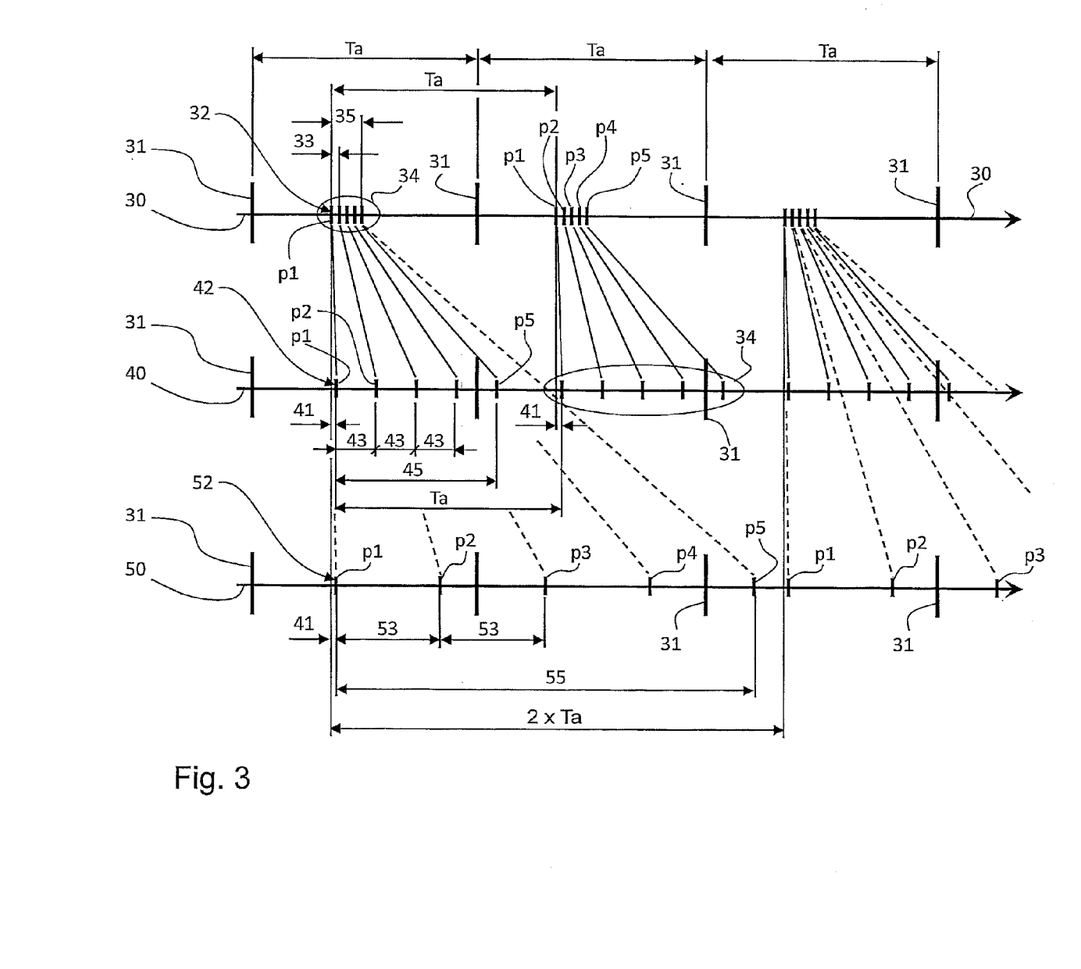

FIG. 3 shows three time axes which are positioned one above the other and extend from left to right. On an upper time axis 30 three successive operating cycles are shown as examples. Each of the three operating cycles has a time period Ta which is equally long if the speed of the post print processing machine is constant. The start of an operating cycle, given the reference 31 in FIG. 3, is normally determined by a defined angle position of a drive motor, a position encoder or a sensor, wherein during each operating cycle, an element controlling the sensor, e.g. a cam, is moved past the sensor. The end of an operating cycle simultaneously denotes the start 31 of the following operating cycle. During the first operating cycle shown on the time axis 30, a first image p1 is recorded by the image recording device 10 at a moment 32. The moment 32 within an operating cycle is determined by a specific position of the position encoder 15, which can be changed by the operator, meaning that during each operating cycle the first image p1 of an image series 34 is recorded if the position encoder 15 occupies a specific position. According to a further embodiment, instead of using the position of the position encoder 15, the moment 32 for starting the recording can also be fixed and/or changed based on the position of the end stop 6 or the position of another machine part, as well as based on the position of a printed product 2. A first image p1 can thus be recorded precisely at the point where the printed product 2 is in the position shown in FIG. 1a, wherein the position of the printed product 2 is detected by a sensor that is not shown herein, e.g. a photoelectric cell, or by the image recording device 10. With the last-mentioned variant, the image recording device 10 continuously records images which are evaluated in the computer unit 12. The images p1 . . . p5 of an image series 34 are transmitted to the display device 13 as soon as the printed product 2 occupies a predetermined position, for example if the leading edge of the printed product 2 that is transported in FIG. 1a reaches the end of the conveying device 3. A second image p2 is recorded following a time interval 33. To prevent overloading of the display in FIG. 3, only five images p1 . . . p5 are displayed during one operating cycle, which together form an image series 34. Of course, an image series 34 can also comprise more or fewer than five images. The images p1 to p5 of the image series 34 are recorded during a recording period 35 and are respectively transmitted immediately to the computer unit 12. During the following operating cycles, image series 34 are again recorded continuously, always at the same moment within the operating cycle, until the device 1 for monitoring the post print processing machine is shut down or its settings are changed.

The center time axis 40 shows at what point the images p1 . . . p5 are displayed on the display device 13, so as to be visible to the operator. With the method according to the invention, the images are displayed in real time. Thus, a time interval 41 passes between the moment 32 for recording the first image p1 and a moment 42 for displaying the first image p1 on the display device 13. Given the presently known components 10, 11, 12, 13 of the device 1 for monitoring a post print processing machine, the time interval 41 typically ranges from 20 micro seconds to 3 seconds. Important is that the time interval 41 remains constant, at least with unchanged settings for the device 1, so that the first image is displayed reliably and at the same time during each operating cycle. To display for the operator the recorded images p1 . . . p5 without noticeable time delay, the shortest possible time interval 41 is determined or preset by the computer unit 12. As shown on the time axis 40, the display of the first image p1 can thus already start during the same operating cycle in which it was recorded. The time interval 41, however, can also be long enough so that the display of the first image p1 of an image series 34 occurs during a following operating cycle. The second image and the additional images p2 . . . p5 are respectively displayed following a time interval 43 which is longer than the time interval 33 between two images during the recording operation. Thus, a time period 45 is required for displaying the image series 34, which can maximally last as long as the time period Ta of one operating cycle. For each operating cycle, the images p1 . . . p5 can thus be displayed which are recorded during one operating cycle.

If the images p1 . . . p5 of an image series 34 are displayed during an interval 55 that exceeds the time period Ta of an operating cycle, one or several images p1 . . . p5 of the second operating cycle cannot be displayed. As can be seen in FIG. 3, on the lowest time axis 50, images of the first image series 34 are still being displayed even though images p1 . . . p5 of an additional process are already being recorded during the second operating cycle. Accordingly, if the time interval 53 between two images p1 . . . p5 is respectively selected big enough for the display, so that the time period 55 for displaying the image series 34 exceeds the time period Ta of an operating cycle, only every second operating cycle can be monitored with the device 1. If the time interval 43, 53 between two images is increased further during the display, or if so many images are recorded during the time period Ta of one operating cycle that the time period 45, 55 for displaying an image series 34 exceeds x operating cycles, then only each $x^{th}$ operating cycle can be monitored. As shown on the time axis 50, relative to the recording of the first image p1 at the moment 32, the images p1 . . . pn are displayed starting at a moment 52 which is also delayed by the aforementioned time interval 41.

In addition to the new option of displaying the images p1 . . . pn in real time following the recording, one embodiment provides that the device 1 for monitoring a post print processing machine can also be embodied to store the recorded images p1 . . . pn on a storage medium. The storage medium can be arranged in the image recording device 10, the computer unit 12 or in a data memory for transmitting data that is connected to the device 1. The operator is thus given the option of calling up the stored images p1 . . . pn while the post print processing machine is still operational and to have these displayed on the display device.

With the aid of the control unit 14, the time intervals 33, 43, 53 between the images p1 . . . pn, in particular between two successive images p1 . . . pn of an image series 34, can be changed during the recording and/or displaying. For example, the time intervals 33 between two images can become progressively shorter during the recording of an image series 34, so that the time interval 33 between the image p1 and the image p2 is larger than the time interval 33 between the image p4 and the image p5. The change in the time interval 33 can be valid for one operating cycle only, for a number of operating cycles selected by the operator, or for all following operating cycles.

For example, an operator can use the control unit 14 to make the following adjustments to the device 1 or in order to monitor a post print processing machine:

Turning the device 1 on and off;
Determining and shifting the moment 32 at which the first image p1 is recorded;
Adjusting a constant time interval 33 between two images p1 . . . pn for the recording during the complete monitoring period;
Adjusting different time intervals 33 between respectively two images p1 . . . pn during the recording of an image series 34;
Adjusting of time intervals 33 between respectively two images p1 . . . pn during the recording of an image series 34, in dependence on an operating parameter such as the speed of the post print processing machine;
Adjusting the number n of images p1 . . . pn of an image series 34 to be recorded;
If applicable, selecting the range to be covered by the image recording device 10;
If applicable, selecting the desired enlargement (zoom) for the image recording device 10;
Determining whether an image series 34 is to be recorded during each operating cycle or only in each $x^{th}$ operating cycle, wherein x is larger than 1;
Storing of the recorded images p1 . . . pn on an internal or external storage medium;
Adjusting a constant time interval 43, 53 between two images p1 . . . pn for the display over the complete monitoring period;
Adjusting of different time intervals 43, 53 between respectively two images p1 . . . pn for displaying an image series 34;
Adjusting of time intervals 43, 53 between respectively two images p1 . . . pn for the display of an image series 34 in dependence on an operating parameter, for example the speed of the post print processing machine;
Stopping and restarting of the display of the images p1 . . . pn on the display device 13 at any optional moment, so as to display an image as long as desired;
Changing the area displayed on the display device; for example through enlarging the image segment;
Selection of a number of images p1 . . . pn of an image series 34 which are displayed with the display device;
If applicable, selecting the signal that determines the moment 32 for recording the first image p1, for example the signal from the position encoder 15, from a position sensor embodied as photoelectric cell, or from the image recording device 10;
Selection of the display device 13 for displaying the recorded images p1 . . . pn if the device 1 is provided with several display devices 13;
Displaying of stored images p1 . . . pn during the operation of the post print processing machine or thereafter;
Switching on and switching off existing lighting means which illuminate permanently or briefly the region recorded by the image recording device 10;
Changing the properties of the images displayed on the display device 13, e.g. brightness, contrast, color and orientation of the image.

Assuming that the post print processing machine processes 18,000 printed products per hour, which is also referred to as 18,000 cycles per hour, a single operating cycle takes 200 ms and the passage of the end stop 6 through the relevant region, shown in FIGS. 1a and 1b and covering an angle α of 60°, lasts approximately 33 ms. During the playback of the images p1 . . . p11, recorded during the 33 ms of the operating cycle, the complete interval Ta of the operating cycle is available. Since the images are recorded during only on a sixth of the operating cycle (α=60°), six times the time is available for the displaying, which corresponds to a slow motion with a factor 6. Despite the six times slower display of the images, no operating cycle and/or no printed product is missed. The user can thus see in real time the effects of a change in the operating parameters, wherein this is achieved with the aforementioned slow motion. Optionally, for example at extremely high speeds, the slow motion can also be distributed over x operating cycles, resulting in a slow motion display only for each $x^{th}$ cycle.

According to a further embodiment, the time interval for the display in slow motion and/or the display speed for the recorded images can be kept constant, regardless of the speed of the post print processing machine. Since the time period Ta of an operating cycle is shortened with increasing speed, less time remains for the display of the recorded images, thereby causing the slow motion factor to decrease.

The method and device according to the invention on the whole offer the options of making adjustments to the running post print processing machine and to check these continuously and in real time with the aid of the slow motion display and/or to derive an automatic correction with the aid of a motorized adjustment of operating parameters on the post print processing machine.

The invention can generally be used for the processing of printed products 2 at all locations where a monitoring of a process contributes to the process safety. The at least one image recording device 10 in that case can be used as a mobile or fixedly installed unit. Since the processing of flat printed products 2 is subject to many interfering variables that cannot be influenced, a monitoring according to the invention makes sense in particular where a change in the direction of the processing occurs, meaning where speeds change, where frictional conditions change, where flow conditions change and where products are to be refined, partial products are to be combined or separated. In addition, the permanent image recording and storing provides the option of an improved diagnosis in case of a malfunction, either through remote control or directly at the location. A further advantage of the device according to the invention is that with the image recording device 10, the existing sensor technology in the form of barcode readers and light barriers can be replaced with a single component.

The invention is not restricted to the exemplary embodiments shown with the aid of the drawing. Rather, it can also be used to monitor gathering and wire-stitching machines, book-binding machines or other post print processing machines and, if applicable, to automatically correct the operating parameters of said machines. Of course, the invention can also be used for monitoring a printing press.

The invention claimed is:

1. A method for monitoring a post print processing machine through which printed products are successively transported, the post print processing machine having an operating cycle during which at least one printed product is processed, the method comprising:
    assigning an image recording device to the post print processing machine;
    connecting the image recording device to a computer unit;
    recording during the operating cycle an image series of at least two images of the printed product, while being processed by the post print processing machine, with a first time interval between the at least two recorded images, wherein the recording includes determining a moment for recording the first image of the image series by one of 1) a position encoder assigned to the post print processing machine and connected to at least one of the image recording device and the computer unit, or 2) the image recording device itself;
    transmitting the recorded images to the computer unit; and
    displaying the recorded images of the image series on a display device that is connected to the computer unit, wherein the displaying includes displaying the first image of the image series in real time and displaying the images with a time interval between the at least two images that is longer than the first time interval to generate a slow motion display of the recorded images.

2. The method according to claim 1, wherein the recording includes changing the moment for recording the first image of the image series.

3. A method for monitoring a post print processing machine through which printed products are successively transported, the method comprising:
    assigning an image recording device to the post print processing machine;
    connecting the image recording device to a computer unit;
    recording during an operating cycle an image series of at least two images of a printed product with a first time interval between the recorded images, wherein the recording includes determining a moment for recording the first image of the image series by one of 1) a position encoder assigned to the post print processing machine and connected to at least one of the image recording device and the computer unit, or 2) the image recording device itself;
    transmitting the images to the computer unit; and
    displaying in real time the images of the image series on a display device that is connected to the computer unit.

4. The method according to claim 3, wherein the displaying includes displaying the images during a time period which corresponds to a maximum time period of the operating cycle of the post print processing machine during which the images were recorded.

5. The method according to claim 3, wherein the displaying includes displaying the images during a time period which is longer than a time period of the operating cycle during which the images were recorded.

6. The method according to claim 3, wherein the displaying of the images starts during the same operating cycle in which a first image of the image series was recorded.

7. The method according to claim 3, further including changing the time interval between two successive images of the image series during at least one of the recording and the displaying.

8. The method according to claim 3, further including changing the number of images of an image series to be recorded during one operating cycle.

9. The method according to claim 3, wherein the displaying includes maintaining time intervals between the images constant during the displaying when a speed of the post print processing machine changes.

10. The method according to claim 3, wherein the recording includes changing the moment for recording the first image of the image series.

* * * * *